Patented Apr. 7, 1953

2,634,271

UNITED STATES PATENT OFFICE 2,634,271

PROCESS FOR PURIFYING FOLIC ACID

Herbert Lindlar, Basel, Switzerland, assignor to Hoffmann-La Roche Inc., Nutley, N. J., a corporation of New Jersey No Drawing. Application June 11, 1949, Serial No. 98,640. In Switzerland July 8, 1948

3 Claims. (Cl. 260—251.5)

The preparation of pure folic acid is a difficult problem. Thus, the separation of folic acid from the accompanying substances present during, or formed by the synthesis (for instance, from 2-amino - 4 - hydroxy-6-pteridylaldehyde and p-amino-benzoyl-glutamic acid) presents difficulties, because the accompanying substances possess properties with respect to formation of salts and solubility which are very similar to the properties of folic acid (both are hardly soluble at all) and because the accompanying substances have a marked capacity of adsorbing folic acid.

It was now found that pure folic acid may be obtained in a relatively simple manner by subjecting crude folic acid in the form of the formyl derivative thereof to purification and hydrolyzing the pure formyl folic acid to folic acid. The purification of formyl folic acid which is soluble in various solvents, such as formic acid, acetic acid, ethylene glycol, glycerin and water, may, for instance, be effected by extracting a crude product containing formyl folic acid with a mixture of ether and formic acid or by fractional precipitation with ether from a solution of the crude product in concentrated formic acid or by a fractional crystallization, for example, from water or glacial acetic acid. The hydrolysis of the purified formyl folic acid to folic acid must be effected carefully in order to avoid cleavage of the —CH₂—NH-bond; it may appropriately be carried out, for instance, by the action of aqueous alkalies or dilute mineral acids at room temperature.

Formyl folic acid to which, according to T. D. Spiess and collaborator, Blood, Volume III, No. 1, year 1948, page 121, the following formula may be assigned:

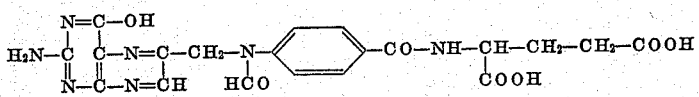

may be prepared by formylating folic acid according to a known method; it will also be obtained by condensation of 2-amino-4-hydroxy-6-pteridylaldehyde and p-amino-benzoyl-glutamic acid in the presence of formic acid.

Example 1

20 parts by weight of a mixture containing about 50 per cent of formyl folic acid (as obtained by the synthesis) are stirred in 100 parts by volume of cold, concentrated formic acid. After about 10 minutes, 90 parts by volume of ether are added which causes precipitation of the less soluble accompanying substances. The mixture is filtered and on the filtration residue the same operation is repeated twice, each time with 100 parts by volume of formic acid and 90 parts by volume of ether. The filtrates are united and ether is added thereto until no further precipitation occurs. The mixture is filtered, and the residue is thoroughly washed with ether. 8 parts by weight of formyl folic acid are obtained which are dissolved in 40 parts by volume of aqueous 3-N-sodium hydroxide thereby causing spontaneous saponification. The solution is diluted with 100 parts of water, shaken with 5 parts by weight of active charcoal and filtered. The filtrate is poured into 4000 parts of water of 90° C. from which, after acidification with acetic acid to a pH of about 3.8, during cooling down folic acid precipitates in the form of needles and rosettes. The yield amounts to about 6 parts by weight.

Example 2

20 parts by weight of a mixture, containing 20 per cent of folic acid, while stirring are boiled for 5 minutes in 100 parts by volume of formic acid whereby the folic acid is formylated. After cooling down, 100 parts by volume of ether are added, the precipitate formed thereby is filtered, the residue is stirred with 100 parts by volume of concentrated formic acid and re-precipitated by addition of 100 parts by volume of ether. The ether-formic acid solutions are united and worked up in accordance with Example 1. 3 parts by weight of formyl folic acid are thus obtained which may be hydrolyzed as indicated in Example 1.

Example 3

20 parts by weight of a finely sieved mixture, containing about 50 per cent of formyl folic acid, while stirring are boiled for a short time in 2000 parts by weight of glacial acetic acid. After cooling down to 20° C., the mixture is filtered and the filtrate is boiled down in vacuo. The residue consists of about 12 parts by weight of a light-yellow to brown, dry substance which may be hydrolyzed and worked up in accordance with the indications in Example 1.

I claim:

1. A process which comprises dissolving, in a solvent which is inert to formyl folic acid, a material selected from the group consisting of the crude formyl folic acid product obtained by formylation of folic acid and the crude formyl folic acid product obtained by the reaction of 2-amino-4-hydroxy-6-pteridyl aldehyde with p-amino-benzoyl-glutamic acid in formic acid, and adding only so much ether as will precipitate impurities from the solution while retaining formyl folic acid in solution.

2. A process which comprises dissolving in cold concentrated formic acid a material selected from the group consisting of the crude formyl folic acid product obtained by formylation of folic acid and the crude formyl folic acid product obtained by the reaction of 2-amino-4-hydroxy-6-pteridyl aldehyde with p-amino-benzoyl-glutamic acid in formic acid, and adding only so much ether as will precipitate impurities from the solution while retaining formyl folic acid in solution.

3. A process which comprises dissolving in hot glacial acetic acid a material selected from the group consisting of the crude formyl folic acid product obtained by formylation of folic acid and the crude formyl folic acid product obtained by the reaction of 2-amino-4-hydroxy-6-pteridyl aldehyde with p-amino-benzoyl-glutamic acid in formic acid, and separating impurities from the solution by cooling while retaining formyl folic acid in solution.

HERBERT LINDLAR.

REFERENCES CITED

The following references are of record in the file of this patent:

UNITED STATES PATENTS

| Number | Name | Date |
|---|---|---|
| 2,515,483 | Wolf et al. | July 18, 1950 |
| 2,520,156 | Lindlar et al. | Aug. 29, 1950 |

OTHER REFERENCES

Morton: Laboratory Technique in Organic Chemistry, first edition (1938), page 163, McGraw-Hill, New York, N. Y.

Wolf et al.: J. Am. Chem. Soc., 69, pp. 2753–2759 (1947).